(No Model.)

C. H. PAXSON & H. CROFT, Jr.
CLUTCHING DEVICE.

No. 325,565. Patented Sept. 1, 1885.

WITNESSES
F. L. Ormand
J. Fred. Reily

Charles H. Paxson,
Henry Croft Jr.,
INVENTORS.

By Louis Bagger & Co.,
Attorneys.

UNITED STATES PATENT OFFICE.

CHARLES H. PAXSON AND HENRY CROFT, JR., OF SPRINGFIELD, OHIO.

CLUTCHING DEVICE.

SPECIFICATION forming part of Letters Patent No. 325,565, dated September 1, 1885.

Application filed July 23, 1885. (No model.)

*To all whom it may concern:*

Be it known that we, CHARLES H. PAXSON and HENRY CROFT, Jr., both residents of Springfield, in the county of Clark and State of Ohio, have invented certain new and useful Improvements in Clutching Devices; and we do hereby declare that the following is a full, clear and exact description of the invention which will enable others skilled in the art to which it appertains to make and use the same, reference being had to the accompanying drawings, which form a part of this specification, and in which—

Figure 1:
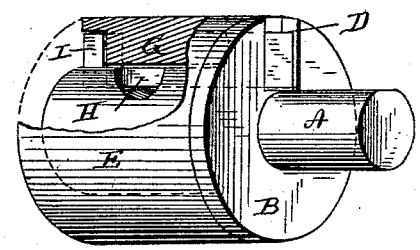
Figure 2:
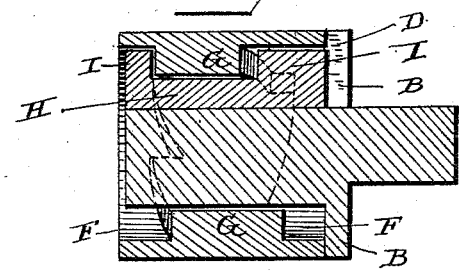
Figure 3:
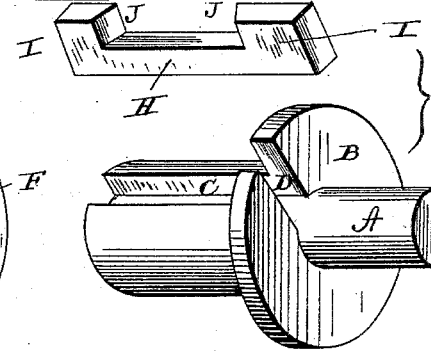

Figure 1 is a perspective view of our improved clutch, showing portions broken away. Fig. 2 is a longitudinal section of the same, showing the ratchet-shoulders in dotted lines; and Fig. 3 is a perspective view of the parts constituting the clutch separated.

Similar letters of reference indicate corresponding parts in all the figures.

Our invention has relation to that class of clutches in which a shaft and the hub of a wheel or pulley may revolve freely and independently of each other, when revolved in one direction, while they will revolve together when revolved in the opposite direction; and it consists in the improved construction and combination of parts of the same, as hereinafter more fully described and claimed.

In the accompanying drawings, the letter A indicates the shaft, which is preferably provided with a flange or collar, B, and which is provided at one side with a longitudinal groove, C, one end of which registers with a slot or notch, D, in the collar.

E is the hub, which revolves freely upon the grooved portion of the shaft, and the ends of the bore of the hub are widened to form interior shoulders, F, which are cut to form ratchet-teeth, G, the teeth of one shoulder alternating with the teeth of the other shoulder, so that a tooth upon one shoulder will be in line with a depression upon the other shoulder.

A gib, H, slides in the longitudinal groove in the shaft, and has at each end an outwardly projecting lip or lug, I, which lugs may alternately engage the ratchet-teeth upon the shoulders, the distance between the lugs being equal to the distance between the end of a tooth of one shoulder and the face of the other shoulder, so that the lugs may slide over the teeth when drawn over the inclined faces of the same.

It will now be seen that when the shaft is revolved within the hub or the hub revolved upon the shaft in the direction which will cause the lips upon the gib to slide upon the inclined faces of the teeth, the said gib will reciprocate in its groove, the alternating inclined faces of the teeth acting alternately upon the lugs at the ends of the gib; but, when the motion is reversed, the inner end of the lug at one end or the other of the gib will bear against the steep face of the ratchet-tooth of one of the shoulders, and will force the shaft and hub to revolve together; and it will be seen that by having the teeth alternating in reference to each other the gib will catch at twice as many points of one revolution as there are teeth upon one shoulder, rendering the clutch very effective without weakening any parts by cutting too many ratchet-teeth.

The inner ends, J, of the lugs are beveled, so as to slide freely over the teeth, and the end of the gib projects sufficiently far out to engage the notch in the collar upon the shaft, and thus divide the strain upon the gib from the groove to the collar.

The gib will always be forced to engage a tooth, one inclined face of a tooth upon one shoulder forcing the lug to engage a tooth upon the opposite shoulder, so that as long as the lugs last the clutch cannot fail to work.

If by accident the gib is pushed from one side of the hub or the other, when one of its lugs engages a ratchet-tooth the other lug will immediately engage a tooth upon the opposite shoulder, so that there is no possible slipping in the clutch.

Having thus described our invention, we claim and desire to secure by Letters Patent of the United States—

1. In a clutch, the combination of a shaft having a longitudinal groove, a hub having shoulders at the ends of its bore formed with alternating raised and depressed portions and with alternating ratchet-teeth, and a gib sliding in the groove in the shaft and having lugs at its ends for sliding over the raised and depressed portions of the shoulders and for engaging the ratchet-teeth, as and for the purpose shown and set forth.

2. In a clutch, the combination of a shaft having a longitudinal groove, a hub having shoulders formed upon the inner side of the ends of its bore, said shoulders having ratchet-teeth corresponding with the spaces between the teeth upon the opposite shoulder, and a gib sliding in the groove in the shaft and having laterally-projecting lugs at its ends sliding with their beveled inner ends upon the faces of the ratchet-teeth and engaging the said teeth, as and for the purpose shown and set forth.

3. In a clutch, the combination of a shaft having a longitudinal groove and a collar having a notch or slot registering with the end of the groove, a hub having interior shoulders at the ends of its bore formed with alternating ratchet-teeth, and a gib sliding in the groove in the shaft and having lugs at its ends engaging the said ratchet-teeth and sliding over their inclined faces, and having its end engaging the slot in the collar upon the shaft, as and for the purpose shown and set forth.

In testimony that we claim the foregoing as our own we have hereunto affixed our signatures in presence of two witnesses.

CHAS. H. PAXSON.
HENRY CROFT, JR.

Witnesses:
H. S. SHOWERS,
F. A. LEWIS.